(12) United States Patent
Kil Sang

(10) Patent No.: US 9,010,139 B2
(45) Date of Patent: Apr. 21, 2015

(54) AIR CONDITIONING SYSTEM AND METHOD OF USING SOLAR CELL

(75) Inventor: Jang Kil Sang, Daejeon (KR)

(73) Assignee: Halla Climate Control Corp. (KR)

( * ) Notice: Subject to any disclaimer, the term of this patent is extended or adjusted under 35 U.S.C. 154(b) by 696 days.

(21) Appl. No.: 12/831,679

(22) Filed: Jul. 7, 2010

(65) Prior Publication Data

US 2011/0005235 A1    Jan. 13, 2011

(30) Foreign Application Priority Data

Jul. 9, 2009  (KR) .................. 10-2009-0062510

(51) Int. Cl.
*B60H 1/00* (2006.01)
*F25B 27/00* (2006.01)

(52) U.S. Cl.
CPC ........ *B60H 1/00428* (2013.01); *B60H 1/00657* (2013.01); *F25B 27/002* (2013.01); *Y02T 10/88* (2013.01)

(58) Field of Classification Search
CPC .................................................. B60H 1/00428
USPC ........ 62/235.1, 236, 159, 244; 236/1 C, 91 D
See application file for complete search history.

(56) References Cited

U.S. PATENT DOCUMENTS

| | | | |
|---|---|---|---|
| 6,158,225 A * | 12/2000 | Muto et al. ...................... 62/3.7 |
| 6,474,089 B1 * | 11/2002 | Chen ............................ 62/235.1 |
| 6,626,003 B1 * | 9/2003 | Kortum et al. ............... 62/235.1 |
| 6,662,572 B1 * | 12/2003 | Howard ......................... 62/3.61 |
| 6,808,450 B2 * | 10/2004 | Snow ............................ 454/137 |
| 6,951,099 B2 * | 10/2005 | Dickau .......................... 60/300 |
| 7,175,098 B2 * | 2/2007 | DeLuca ........................ 236/1 C |
| 7,621,136 B2 * | 11/2009 | Kim ................................ 62/3.3 |
| 2008/0047277 A1 * | 2/2008 | Kim ................................ 62/3.3 |
| 2008/0078193 A1 * | 4/2008 | Lin et al. ..................... 62/235.1 |
| 2008/0202139 A1 * | 8/2008 | Darroman et al. ............. 62/244 |

FOREIGN PATENT DOCUMENTS

WO   WO 2008127016 A1 * 10/2008

* cited by examiner

*Primary Examiner* — Mohammad M Ali
*Assistant Examiner* — Raheena Rehman
(74) *Attorney, Agent, or Firm* — The Farrell Law Firm, P.C.

(57) ABSTRACT

An air conditioning system using a solar cell, which uses the electricity effectively by heating the heat devices for designated time and a method for driving the system. The air conditioning system includes a solar cell generating electricity from solar light, a power distribution control part controlling operating voltage of the electricity of the solar cell and distributing to a battery or to the heating element, a control terminal generating a user command signal and an interface part controlling the power distribution control part in response to a command signal from the control terminal.

2 Claims, 4 Drawing Sheets

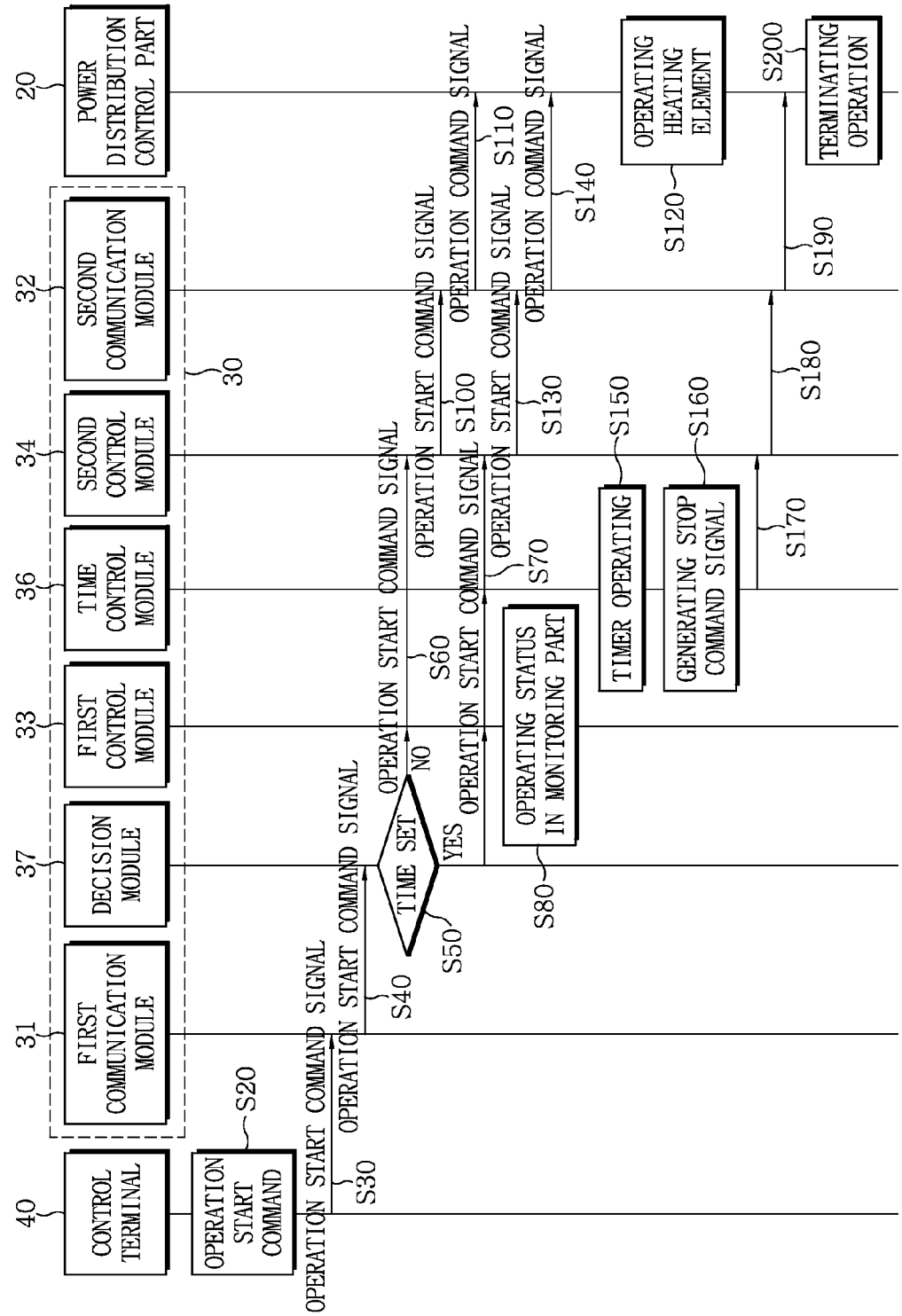

AIR CONDITIONING SYSTEM AND METHOD OF USING SOLAR CELL

PRIORITY

This application claims priority under 35 U.S.C. §119 to Korean Patent Application No. 10-2009-0062510, which was filed on Jul. 9, 2009 in the Korean Intellectual Property Office (KIPO), the content of which is hereby incorporated by reference in its entirety.

BACKGROUND OF THE DISCLOSURE

1. Field of the Disclosure

The present invention relates to an air conditioning system using a solar cell and a method for driving the system. More particularly, the present invention relates to an air conditioning system using electricity generated from a solar cell by heating a device in a vehicle during a predetermined time by using electricity generated from the solar cell and a method for driving the system.

2. Description of the Related Art

Recently, an air conditioning system using solar cell has been developed actively because of the increase of the fuel price such as gasoline, diesel and so on, which are used for vehicle. As one of embodiments of the air conditioning system using the solar cell, the solar cell is applied as a power supplier to the air conditioning system cooling the air in the vehicle. The power generation efficiency of the solar cell is increasing, but the current efficiency of the solar cell is too small to be used as the main power supplier of the air conditioning system.

The air conditioning system using the solar cell, which uses a fan or an air blower for cooling the air in the vehicle, is introduced in U.S. Pat. No. 6,439,658 and U.S. Pat. No. 6,290,593 as illustrated in FIGS. 1a and 1b.

Referring to FIG. 1a, the solar cell is installed at the sunroof of the vehicle and a ventilation fan is installed at the back part and lower part of the seat. When the vehicle is parked, the temperature of the seat keeps cool by driving the ventilation fan by using the electricity generated in the solar cell. The ventilation fan of the seat includes a temperature sensor at the seat, and is driven when the temperature of the temperature sensor is over the predetermined temperature.

Moreover, the air conditioning system using the solar cell illustrated in FIG. 1a, supplies the electricity to the air blower installed in the vehicle and ventilates the inner air when the surplus power is generated.

Moreover, referring to FIG. 1b, the another embodiment of the conventional air conditioning system using the solar cell is illustrated in FIG. 1b, which supplies electricity generated in the solar cell to the vehicle fan or recharges the vehicle battery when the vehicle engine stops. The air conditioning system using the solar cell in FIG. 1b applies the electricity generated in the solar cell to the fan or the recharge of the battery by the manual switch.

However, the conventional air conditioning system using the solar cell usually uses the electricity generated in the solar cell to cool the vehicle air. In winter or when cooling the air in the vehicle is needless, the usefulness is decreased and the generation is kept without the time limitation, so that the heat is lost by the temperature difference and the actual efficiency is decreased.

SUMMARY OF THE DISCLOSURE

The present invention provides an air conditioning system using solar cell. The present invention also provides a method for driving an air conditioning system using solar cell.

In one aspect of the present invention, the air conditioning system includes a solar cell generating electricity from solar light, a power distribution control part controlling operating voltage of the electricity of the solar cell and distributing to a battery or the heating element, a control terminal generating a user command signal and an interface part controlling the power distribution control part in response to a command signal from the control terminal. The interface part may include a first communication module which is a communication interface between the control terminal and the interface part, a second communication module which is a communication interface between the interface part and the power distribution control part, a monitoring part monitoring status of the air conditioning system, a first control module controlling the monitoring part, a second control module controlling electrical power supply to the heating element by controlling the power distribution control part and a time control module receiving a command signal from the control terminal and controlling the second control module to operate the heating element during time of a key-corresponding signal included in the command signal.

The heating element may include a seat heater, an engine inner heater, and a heat storage part.

The interface part may include a decision module let the time control module to control the second control module during the time of the key-corresponding signal when the command signal from the control terminal includes the key-corresponding signal.

The monitoring part may include one of a display device or an alarm device.

In another aspect of the present invention, a method for driving an air conditioning system using solar cell includes a) transferring a command signal from a control terminal to an interface part, b) controlling a power distribution control part in response to the command signal and c) operating a heating element in response to the power distribution control part.

The method for driving the air conditioning system may further include d) terminating the operation of the heating element when a set-time is ended. The step of b) may include transferring the command signal from a first communication module to a decision module, based on the command signal, deciding if an operating time is set up by the decision module, transferring the command signal from the decision module to a first control module, a time control module and a second control module and displaying an operating status in response to the command signal by the first control module, and operating timing operation during the set-up time by the time control module, and controlling the power distribution control part by the second control module.

According to the present invention, using solar cell, air in the vehicle, the inner part of the vehicle engine and the heating storage part are heated. Each part of the vehicle is heated effectively during the winter season, so that a comfortable driving condition, efficiency in fuel consumption, and a reduction exhaust gas are provided.

Moreover, the operation is limited during the predetermined time, thereby being able to use electricity generated by solar cell more effectively. The heat loss by the temperature difference and the decrease of the actual efficiency, which might be generated by full-time operating, can be solved.

BRIEF DESCRIPTION OF THE DRAWINGS

The above and other advantages of the present invention will become readily apparent by reference to the following detailed description when considered in conjunction with the accompanying drawings wherein:

FIG. 4 is a flow chart of an air conditioning system using solar cell in accordance with an embodiment of the present invention.

NUMERICAL REFERENCES IN THE DRAWINGS

Figure 1A:
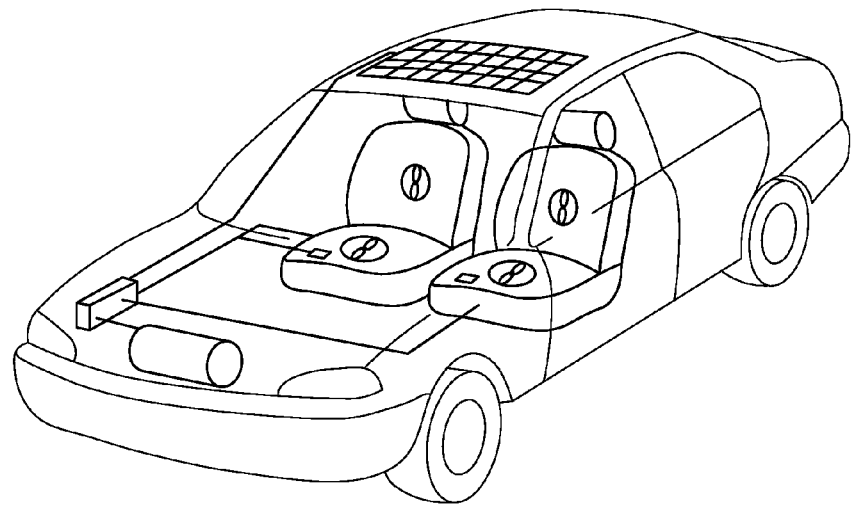
FIG. 1a is a perspective view illustrating a conventional air conditioning system using solar cell.

| | |
|---|---|
| 10: solar cell | 20: power distribution control part |
| 30: interface part | 31: a first communication module |
| 32: a second communication module | |
| 33: a first control module | 34: a second control module |
| 35: monitoring part | 36: time control module |
| 37: decision module | |
| 40: control terminal | 50: heating element |
| 60: battery | 51: seat heater |
| 52: engine inner heater | 54: heat storage part |

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
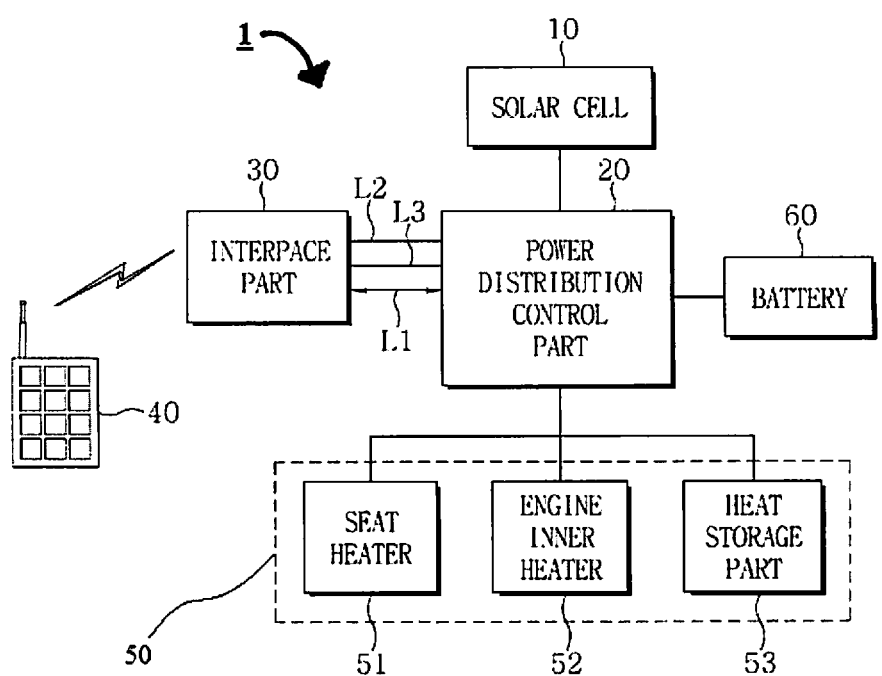
FIG. 2 is a block diagram illustrating an air conditioning system using solar cell in accordance with an embodiment of the present invention.

FIG. 2 is a block diagram illustrating an air conditioning system using solar cell in accordance with an embodiment of the present invention.

Referring to FIG. 2, the air conditioning system using solar cell in accordance with an embodiment of the present invention includes a solar cell 10, a power distribution control part 20, an interface part 30, a control terminal 40, and a heating element 50.

The solar cell 10 receives a solar light and generates electricity by photoelectric effect. The solar cell 10 may be formed with a plurality of cells connected in series or parallel in order to increase light efficiency. The solar cell 10 may include solar cell of a general well-known shape or may not be limited specifically.

The power distribution control part 20 controls operation voltage of electricity provided from the solar cell 10 and provides operation voltage to the interface part 30, the heating element 50 and the battery 60 at constant intensity.

The intensity of the solar light is not constant according to the weather change, and the electricity generated at the solar cell 10 might not be constant accordingly. When the inconstant electricity is provided to the interface part 30, the heating element 50 or the battery 60, the interface part 30, the heating element 50 or the battery 60 may shorten the life cycle or may not operate properly.

The interface part 30 transfers the command by user to the power distribution control part 20 and display the signal from the power distribution control part 20, so that the user can know the current operating status of the air conditioning system 1.

The communication between the interface part 30 and the power distribution control part 20 may be established through a communication line L1, and the power supply from the power distribution control part 20 to the interface part 30 may be established at a power line L2. A ground line L3 may be connected between the power distribution control part 20 and the interface part 30 for grounding.

The communication between the interface part 30 and the power distribution control part 20 may be provided by wire network and well-known communication protocol such as in serial communication, in parallel communication, in USB (Universal Serial Bus) communication, in LAN (Local Access Network) and so on. The communication between the interface part 30 and the power distribution control part 20 may be provided by wireless network and well-known communication protocol such as Bluetooth, wireless LAN, UWB, zigbee, infrared light (IR), radio frequency (RF) and so on.

Moreover, the power line L2 for providing the electric power and the communication line L1 for communication are illustrated as provided separately. The present invention is not limited for the separate line formations. The power line L2 and the communication line L1 may be combined physically using the power line communication (PLC).

Figure 3:
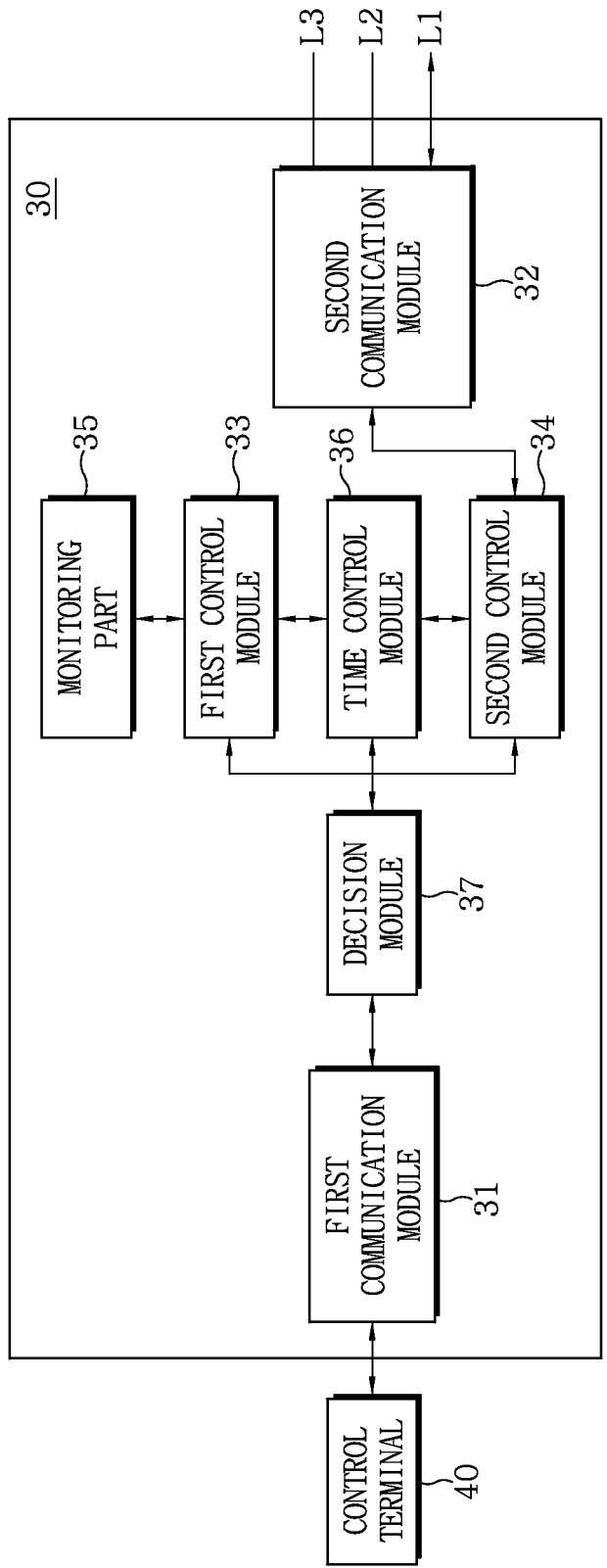
FIG. 3 is a block diagram illustrating an interface part of the air conditioning system in FIG. 2.

The more detail description for the interface part 30 will be introduced in reference with FIG. 3.

The control terminal 40 is formed as a small shape for portability and is formed to be able to transfer a command signal to the interface part 30. The command signal includes a reset signal re-setting a set of the interface part 30, an on-off signal switching on or off the interface part 30, and an option signal choosing the options of the interface part 30.

The command signal may be matched with each of operations in one-one correspondence, and the number of the command signal may be adjusted according to the number of the operations by the interface part 30.

Moreover, the control terminal 40 may include a keypad having a plurality of keys, which has numbers and characters, and may provide corresponding signal by the designated input, for example pushing the keys, to the interface part 30 via wire or wireless communication line.

The command signal from the control terminal 40 to the interface part 30 and the transfer of the key-corresponding signal and the operating process of the interface part 30 in response to the signal will be well-known to the skilled person. The detailed description will be omitted.

The transfer from the control terminal 40 to the interface part 30 may be provided by wire network and well-known communication protocol such as in serial communication, in parallel communication, in USB (Universal Serial Bus) communication, in LAN (Local Access Network) and so on. In addition, the transfer from the control terminal 40 to the interface part 30 may be provided by wireless network and well-known communication protocol such as Bluetooth, wireless LAN, UWB, ZigBee, infrared light (IR), radio frequency (RF) and so on.

The heating element 50 may include a seat heater 51, an engine inner heater 52 and a heat storage part 53.

The seat heater 51 is disposed in the vehicle seat and receives from the power distribution control part 20 to heat the vehicle seat. The seat heater 51 may include a heating wire and a heat insulator (not shown) preventing the vehicle seat from the direct contact with the heating wire.

The seat heater 51 heats the vehicle seat, so that the driver maintains the temperature inside the vehicle during the winter time.

Figure 1B:
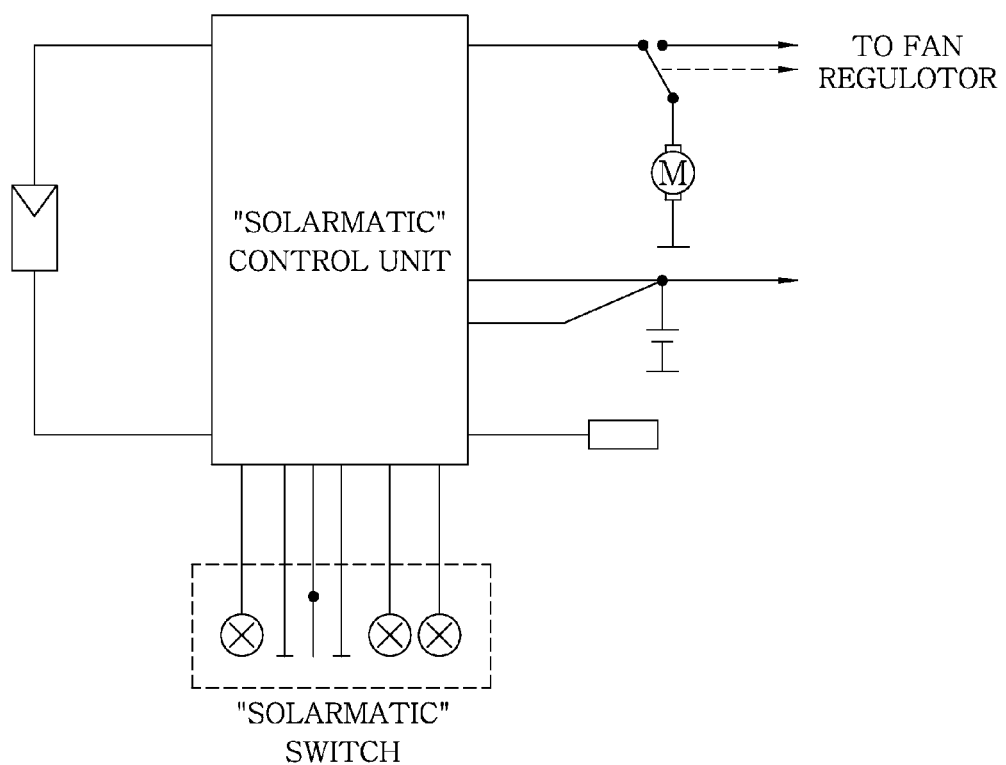
FIG. 1b is a circuit view illustrating a conventional air conditioning system using solar cell.

The engine inner heater 52 is disposed in the engine of the vehicle as illustrated in FIG. 1, and receives the electricity from the power distribution control part 20 and heats the engine. The engine inner heater 52 also may include a heating wire and a heat insulator (not shown) preventing the vehicle seat from the direct contact with the heating wire, as the seat heater 51.

The engine inner heater 52 heats the vehicle engine, so that the engine will be pre-heated before driving, thereby, reducing the exhaust gas and improving the fuel efficiency.

The heat storage part 53 may store the heat for a long time. The heat storage part 53 may include a heating wire (not shown) receiving the electricity from the power distribution control part 20 and heating the heat storage part 53, a heat absorption part having water or calcium chloride as having high specific heat, and a heat insulator (not shown) preventing the heat absorption part from the direct contact with the heating wire.

The heat generated by and stored by the heat storage part 53 is circulated through a pipe in the vehicle (not shown) and is stored and re-used.

FIG. 3 is a block diagram illustrating an interface part of the air conditioning system in FIG. 2.

Referring to FIG. 3, the interface part 30 in accordance with and embodiment of the present invention includes a first communication module 31, a second communication module 32, a first control module 33 and a second control module and a monitoring part 35.

The first communication module 31 communicates the command signal or the key-corresponding signal from the control terminal 40 to the interface part 30.

The second communication module 32 communicates the interface part 30 and the power distribution control part 20.

The first and second communication modules 31, 32 may be communication modules corresponding to the communication modules belonging to each of the control terminal 40 and the power distribution control part 20. For example, when the control terminal 40 and the power distribution control part 20 include RF transferring/receiving module, IR transferring/receiving module, Bluetooth transferring/receiving module, wireless transferring/receiving module, ZigBee transferring/receiving module, the first and the second communication module 31, 32 may be transferring/receiving modules corresponding to RF transferring/receiving module, IR transferring/receiving module, Bluetooth transferring/receiving module, wireless LAN transferring/receiving module, ZigBee transferring/receiving module.

The first control module 33 receives the command signal from the control terminal 40 via the first communication module 31 and controls the operation of the monitoring part 35 in response to the command signal.

For example, the first control module 33 controls the monitoring part 35 of the interface part 30 to display the operation status of the air conditioning system 1.

The second control module 34 receives the command signal from the control terminal 40 via the first communication module 31 and controls the power distribution control part 20 in response to the command signal. By controlling the power distribution control part 20, the second control module 34 controls the operation of the heating element 50 in the end.

The first control module 33 and the second control module 34 may be digital process, for example, DSP, and may be composited to operate according to the clock signal of the clock generator (not shown) generating the clock signal.

The interface part 30 in accordance with an embodiment of the present invention may further include a time control module 36 deciding an operating time and control to operate during a designated time.

The time control module 36 receives the command signal and the key-corresponding signal from the control terminal 40 via the first communication module 31 and control the second control module to operate the heating element 50 during the time corresponding to the key-corresponding signal and to terminate the operation of the heating element 50 when the time corresponding to the key-corresponding signal ends.

The time control module 36 controls the second control module 34, so that the time control module 36 control the power distribution control part 20, thereby, controlling the heating element 50.

The user could operate the seat heater 51, the engine inner heater 52 and the heat storage part 53 from the morning, for example, during about 30 minutes at around 7 AM. Thus, the seat, the engine and the heat storage part 53 are heated, so that the fuel efficiency improves, the exhaust gas reduces and the driving environment is improved.

The time set by the time control module 36 can display the accurate operating start time, the operating end time, the operating duration time and so on to the monitoring part 35 by the first control module 33.

The time control module 36 also may be digital processor, for example, DSP, may be operated by the clock signal generator (not shown), and may display the accurate time on the monitoring part 35.

The interface part 30 in accordance with an embodiment of the present invention may further include a decision module 37. The decision module 37 may proceed the timer operation for operating only during the set time, or switches on/off the control terminal 40 without the timer operation.

The decision module 37 decides if the receiving signal from the control terminal 40 via the first communication module 31 includes the key-corresponding signal for the process of the timer operation. If the receiving signal includes the key-corresponding signal, the decision module 37 transfers the key-corresponding signal and the command signal to the first control module 33 and the time control module 36. If the receiving signal may not include the key-corresponding signal and may include only the command signal, the decision module 37 may transfer the command signal to the first control module 33 and the second control module 34. Thus, the timer operation and the non-timer operation are decided and operated separately.

The first control module 33, the second control module 34, the time control module 36 and the decision module 37 are illustrated in FIG. 3 separately. The present invention is not limited to FIG. 3, and one or two more integrated modules, for example, SOC (System on Chip) type, may be integrated.

FIG. 4 is a flow chart of an air conditioning system using solar cell in accordance with an embodiment of the present invention.

Referring to FIG. 4, as an initial setting status, the user starts the engine and starts the solar cell 10. As the solar cell 10 operates, the electricity generated by the solar cell 10 is provided to the power distribution control part 20.

The provided electricity is supplied to the battery 60 and the interface part 30, so that the battery 60 is recharged and the interface part 30 uses as the operating power.

In the initial setting status, as a default, the electricity generated from the solar cell 10 may be set to not be provided to the heat element 50 by the power distribution control part 20.

Through the key pad (not shown) of the control terminal 40, the user inputs the command signal which means starting the operation of the heating element 50, for example, pressing the operating start button (S20).

The control terminal 40 transfers the command signal corresponding to the inputted command signal to the interface part 30 (S30).

The first communication module 31 of the interface part 30 receives the command signal and transfers the received command signal to the decision module 37 (S40).

The decision module 37 decides if the time set exists for the timer operation in response to the received command signal (S50). When the time set does not exist, the decision module 37 transfers the command signal to the first control module 33 and the second control module 34 (S60). When the time set exists, the decision module 37 transfers the command signal of the key-corresponding signal to the first control module 33, the second control module 34 and the time control module 36 (S70).

When the time set does not exist, the first control module 33 receiving the command signal displays the command signal as a visual character, for example, 'on service' on the monitoring part 35 (S80).

The second control module 34 transfers the operating command signal (S100), which allows the power distribution control part 20 to provide the electricity to the heating element 50 from the solar cell 10 (S120), to the second communication module 32 in response to the command signal. The second communication module 32 transfers the operation command signal to the power distribution control part 20 (S130).

The power distribution control part 20 provides (S120) the electricity to operate the heating element 50 in response to the operation command signal S110.

If the time set exists, the first control module 33 receiving the command signal displays the command signal as a visual character, for example, 'on service', to the monitoring part 35 (S80). The command signal includes the timing for the timer operation and the information for the timer operation may be displayed on the monitoring part 35.

The second control module 34 transfers the operating command signal (S130) to the second communication module 32, which allows the power distribution control part 20 to provide the electricity from the solar cell to the heating element 50 (S120) in response to the command signal S140. The second communication module 32 transfers the operating command signal to the power distribution control part 20 (S140).

The power distribution control part 20 provides the electricity to the heating element 50 in response to the operating command signal (S120).

The time control module 36 proceeds the timer operation in order to the heating element 50 to operate during the time corresponding to the key-corresponding signal belonging to the command signal (S150). When the set time, for example, 30 minutes, ends, the stop command signal generated (S160) and the stop command signal is provided to the second control module 34 (S170).

The second control module 34 provides the operating command signal to the power distribution control part 20 via the second communication module (S180) in order to terminate the operation of the heating element 50 by stopping the electricity supply to the heating element 50 from the power distribution control part 20 in response to the stop command signal (S190).

The power distribution control part 20 stop the electricity supply to the heating element 50 in response to the operating command signal, so that the operation of the heating element 50 is terminated (S200).

As described above, the electricity generated by the solar cell is used effectively and the heat loss caused by the all-time operating and the reduction of the actual fuel efficiency may be solved by operating the heating element 50 during the required time.

Although the certain embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. An air conditioning system comprising:
   a solar cell generating electricity from solar light;
   a power distribution control part directly connected to the solar cell, an interface part, a battery, and a heating element, the power distribution control part controlling operating voltage of the electricity of the solar cell and distributing electrical power to the interface part, the battery, and the heating element;
   a wireless transferring module generating a user command signal;
   the interface part controlling the power distribution control part in response to a command signal received from the wireless transferring module,
   wherein the interface part comprises:
      a monitoring part monitoring status of the air conditioning system;
      a first control module controlling the monitoring part;
      a second control module controlling electrical power supply to the heating element by controlling the power distribution control part;
      a time control module receiving a command signal from the wireless transferring module and controlling the second control module to operate the heating element during time of a key-corresponding signal included in the command signal; and
   a decision module configured to:
      determine whether the command signal from the wireless transferring module includes the key-corresponding signal,
      transfer the command signal to the first control module and the time control module if the wireless transferring module includes the key-corresponding signal, and
      transfer the command signal to the first control module and the second control module if the wireless transferring module does not include the key-corresponding signal,
   wherein the heating element comprises a seat heater, an engine inner heater and a heat storage part.

2. A method for driving an air conditioning system using a solar cell, the method comprising:
   a) transferring, by a wireless transferring module, a user command signal to an interface part;
   b) determining, by a decision module of the interface part, whether the command signal from the wireless transferring module includes a key-corresponding signal;
   c) transferring, by the decision module if the command signal from the wireless transferring module includes the key-corresponding signal, the command signal to a time control module of the interface part;
   d) transferring, by the decision module, the command signal to a second control module of the interface part, if the command signal from the wireless transferring module does not include the key-corresponding signal;
   e) operating, by the time control module, the second control module during a time of the key-corresponding signal; and
   f) controlling, by the second control module, an electrical power supply to a heating element by controlling a power distribution control part, wherein the power distribution control part is directly connected to the solar cell, the heating element, the interface part, and a battery and is configured to control operating voltage of the solar cell, to distribute electrical power to the interface part, the battery, and the heating element,
   wherein the heating element comprises a seat heater, an engine inner heater, and a heat storage part.

* * * * *